(12) United States Patent
Braun (10) Patent No.: US 8,584,432 B2
(45) Date of Patent: Nov. 19, 2013

(54) PANEL, ESPECIALLY FLOOR PANEL

(75) Inventor: Roger Braun, Willisau (CH)

(73) Assignee: Flooring Technologies Ltd., Pieta (MT)

( * ) Notice: Subject to any disclaimer, the term of this patent is extended or adjusted under 35 U.S.C. 154(b) by 266 days.

(21) Appl. No.: 12/937,494

(22) PCT Filed: Jan. 13, 2010

(86) PCT No.: PCT/EP2010/000112
§ 371 (c)(1),
(2), (4) Date: Dec. 15, 2010

(87) PCT Pub. No.: WO2010/086084
PCT Pub. Date: Aug. 5, 2010

(65) Prior Publication Data
US 2011/0094178 A1      Apr. 28, 2011

(30) Foreign Application Priority Data

Jan. 28, 2009   (EP) .................................. 09001179

(51) Int. Cl.
*E04B 2/00* (2006.01)

(52) U.S. Cl.
USPC ............. 52/748.1; 52/390; 52/539; 52/588.1; 428/50

(58) Field of Classification Search
USPC .......... 52/390, 392, 533, 534, 539, 553, 578, 52/582.1, 582.2, 585.1, 586.1, 586.2, 52/587.1, 588.1, 589.1, 590.2, 590.3, 52/591.1, 591.2, 591.3, 591.4, 591.5, 52/592.1, 582.4, 745.07, 745.19, 747.1, 52/747.11, 748.1, 748.11; 403/334, 345, 403/364–368, 372, 375, 376, 381; 404/34, 404/35, 40, 41, 46, 47, 49–58, 68, 70; 428/44, 47–50, 57, 58, 60, 61, 106, 428/192–194
See application file for complete search history.

(56) References Cited

U.S. PATENT DOCUMENTS 7,896,571 B1 * 3/2011 Hannig et al. ................ 403/339

2003/0009971 A1 * 1/2003 Palmberg ........................ 52/578

(Continued)

FOREIGN PATENT DOCUMENTS

DE       19823357       11/1999
DE       20008708       5/2000

(Continued)

OTHER PUBLICATIONS

Written Opinion of the International Searching Authority for PCT/DE2010/000112, Aug. 2, 2011.

*Primary Examiner* — William Gilbert
(74) *Attorney, Agent, or Firm* — Andrew M. Calderon; Roberts Mlotkowski Safran & Cole, P.C.

(57) ABSTRACT

A panel, especially floor panel comprises a core produced of a wood product or a mixture of a wood product/synthetic material. The panel includes a top and a bottom, and is provided with mating hook elements on at least two opposite lateral edges thereof. The first hook element is formed by a profiled section which is essentially open to the top and the second hook element is formed by a profiled section which is essentially open to the bottom. The profiled section on the first hook element forms a projection which is essentially facing the top and on the second hook element forms a projection which is essentially open to the bottom. Two identical panels can be interconnected and interlocked by an essentially vertical joining movement in the horizontal and the vertical direction. At least one of the projections is deviated during the joining movement in the horizontal direction and then snaps into a locking edge which extends essentially in the horizontal direction to vertically lock the panels. At least one of the hook elements has a segmented design, thereby forming a plurality of parallel interspaced spring elements. The panel according to the invention is characterized in that the spring elements are diagonally arranged at an angle to the longitudinal axis.

22 Claims, 6 Drawing Sheets

(56) References Cited

U.S. PATENT DOCUMENTS

2003/0101681 A1 6/2003 Tychsen
2009/0249733 A1 10/2009 Moebus

FOREIGN PATENT DOCUMENTS

| | | |
|---|---|---|
| DE | 10159284 | 6/2003 |
| DE | 10224540 | 12/2003 |
| DE | 102005002297 | 8/2005 |
| DE | 102007020271 | 8/2008 |
| DE | 102007015048 | 10/2008 |
| FR | 2498666 | 1/1981 |
| WO | 2008116623 | 10/2008 |

\* cited by examiner

PANEL, ESPECIALLY FLOOR PANEL

BACKGROUND OF THE INVENTION

1. Field of the Invention

The invention relates to a panel, especially a floor panel, with a core of wood product or wood product-plastic mixture, a top and a bottom which is provided with hook elements which correspond to one another on at least two opposite side edges, the first hook element being formed by profiling which is essentially open to the top and the second hook element being formed by profiling which is essentially open to the bottom and which on the first hook element forms a projection which is pointed essentially toward the top and on the second element a projection pointed essentially toward the bottom, and at least one of the hook elements being a spring element which deviates in the horizontal direction in the joining motion and then for purposes of vertical interlocking snaps in behind an interlocking edge which extends essentially in the horizontal direction, and at least one of the hook elements being segmented and a plurality of spring elements spaced parallel forming in this way.

2. Discussion of Background Information

This panel is known for example from DE 10 2007 020 271 A1.

In the panels known from DE 10 2007 015 048 A1 the interlocking element which has an interlocking surface which extends in the horizontal direction is cut free relative to the core, by which the interlocking element can execute a deviating motion in the lowering motion. At a small panel thickness, especially for panels with a thickness of 6 or 7 mm, the stiffness of these connections is often not sufficient. In conventional tests with steel rolls (DIN 13329) slight vertical offsets between adjacent panels can arise due to multiple cyclic loading, especially in the region of the transverse-side interlocking; this becomes immediately apparent with unfavorable light incidence, by which the floor coating can engender the impression of poor quality.

DE 102 24 540 A1 discloses a floor panel which is bordered in the horizontal plane by a top which is provided with a decorative layer and a bottom which is provided for support on a subfloor, which panel is provided with means for detachable connection of at least two panels, on at least one first side edge the connecting means being made such that interlocking takes place in the transverse direction and vertical direction, on a second side edge which runs at an angle to the first side edge interlocking elements being made for interlocking in the vertical direction with other panels. In this floor panel the interlocking elements are made spaced apart from one another in the transverse direction and in the vertical direction on two essentially vertically aligned walls which are spaced apart. So that joining of two panels remains possible, the horizontally aligned interlocking surfaces can be dimensioned to be very small. The transverse extension is in the range of roughly 0.05 to 1.0 mm. But this necessarily also makes it possible to accommodate small, vertically directed forces so that fabrication with extremely small tolerances is necessary in order to ensure that the connection does not snap back under normal loading with slight floor unevenness and/or soft subsurfaces.

DE 101 59 284 A1 discloses a floor panel with a core of wood product which has a groove which forms an upper lip and a lower lip on at least one side edge over its length and on the opposite side edge is made with a tongue which corresponds to the groove. For interlocking of panels which are connected to one another the tongue is provided with at least one projection, and the groove has at least one depression on the lip which is opposite at least one projection. Here the depression is longer than the projection, and the lip provided with the depression on the side edge has at least one recess which extends as far as the depression, the length of the recess being at least as large as the length of the projection. Relative to the lengthwise direction the recesses and the projection are offset to one another. The connection of two panels takes place by this configuration in the manner of a quarter-turn fastener by first of all a joining movement which points in the transverse direction of the panel being carried out so that the tongue is inserted into the groove and then the interlocking of the two panels takes place in the manner of a quarter-turn fastener by a movement pointed in the lengthwise direction.

This profiling of the side edges is mechanically very complex and installation of the panels becomes in part more complicated since it must be ensured that the tongues are plunged into the grooves over the full length of the side edges. If then the concluding interlocking motion is not carried out completely parallel to the lengthwise axis of the panel, there is the danger that the panel to be interlocked will be tilted and will swivel the tongue out of the groove so that interlocking is no longer possible.

DE 198 23 357 A1 discloses a wall tile with an essentially flat, cuboidal base body which has a visible surface, a fastening surface and face surfaces which connect the visible surface to the attachment surface. On at least one of the face sides there is a spacer which is integrated with the tile and which comprises means for compensation of the thermal elongation of the tile. These spacers are profiled in a hook shape so that two tiles can be connected to one another by way of a vertical lowering motion.

DE 200 08 708 U1 discloses panels with side edges which are profiled in a hook shape and which can be connected positively to one another by a vertical lowering motion.

WO 2008/116623 A1 discloses floor panels which on at least two opposite side edges have profiling corresponding to one another such that two identically made panels can be connected and interlocked with one another by an essentially vertical joining movement in the horizontal and vertical direction. The interlocking in the vertical direction is caused by a spring element which can be moved in the horizontal direction and which snaps in behind an interlocking edge which extends essentially in the horizontal direction in the joining motion. This spring element is formed integrally out of the core.

SUMMARY OF THE INVENTION

Proceeding from this problem formulation, the initially described panel is to be improved such that profiling of the hook elements is improved such that larger interlocking surfaces can be implemented and thus reliable interlocking is ensured.

To solve the problem a generic panel is characterized in that spring elements are arranged running obliquely at an angle to the longitudinal axis.

This interlocking is especially suited for the transverse side of the panels to be connected to one another. The hook elements on the opposite side edges extend behind one another and thus interlock two panels in the horizontal and in the vertical direction. The elastically deflectable projections of the hook elements are displaced by the segmenting and in the end position of the panels snap again into their initial position, by which vertical interlocking takes place. Because the tongue elements run at an angle to the side edge (lengthwise axis), it becomes possible for the respective bottom hook element to deviate down and at the same time laterally in the connection of two panels. This yields more space in order to allow the upper hook element to pass. The interlocking surface becomes larger due to the oblique surface; this allows the interlocking to become more reliable.

Preferably the two projections have an undercut and each undercut has an interlocking edge which extends essentially in the horizontal direction.

When the spring elements are made on the hook element which is open toward the top, installation of the panels is simplified because the lowering motion of the profile which is to be newly installed is made more uniform.

When the bottoms of the spring elements are bevelled at least in the region of the projection on the bottom at an angle β relative to the horizontal, enough deviation space is made available for the spring element to be able to execute a pivoting motion during interlocking.

The deviation motion of the spring elements is composed of several movements. Mainly the spring elements are displaced by the upper projection in the direction of the longitudinal axis of the panel. The spring elements can however also deviate in the transverse direction of the panel due to the slots which run obliquely to the longitudinal axis. The bending stiffness of the spring elements in the transverse direction is defined mainly by their width. The horizontal deflection of the projection which is caused by the interlocking force in the transverse direction leads to a widening of the groove so that the undercut of one projection extends behind the undercut of the other projection. The deviation movements of the spring element can be superimposed by rotation around an axis which runs in the transverse direction if the spring element has enough space downward for deviating.

The angle β is preferably less than or equal to 10°.

The spring elements are preferably regularly spaced toward one another.

The method for connecting and interlocking two panels designed as claimed in the invention proceeds by the panel to be joined with the hook element which is open to the bottom being pivoted around a nearby pivoting axis which is parallel to the longitudinal side into the panel which lies on the floor into the hook element which is open toward the top, and in doing so the projection of the hook element which is open toward the bottom grasping the projections of the spring elements next to one another and bending out elastically so that this deviating and each projection of the spring element springs back [sic] when the undercut formed in it overlaps the in the projection of the hook element which is open to the bottom [sic], the deviating motion of the spring elements being divided into the following three movements:

a) displacement of the projection in the direction of the longitudinal axis of the panel, b) deviation of the projection in the transverse direction of the panel, c) widening of the groove which is open to the top and which is made between the projection and the side edge.

The widening of the groove can be superimposed by a pivoting motion of the projection around an axis which runs parallel to the transverse side of the panel.

BRIEF DESCRIPTION OF THE DRAWINGS

Exemplary embodiments of the invention will be detailed below using the drawings.

Panels 1, 2 are made identically. They consist of a core 17 of wood product or a wood-product-plastic mixture. The longitudinal side of one panel is generally longer than its transverse side. In the drawings the panels 1, 2 are shown at the connection site of their transverse side. On their opposite side edges I, II the panels 1, 2 are profiled, the side edge I having been milled from the top 18 and the side edge II from the bottom 19. In this way two hook elements 4, 6 which correspond to one another are formed, the hook element 4 comprising a projection 5 pointed toward the top 18 and the hook element 6 comprising a projection 7 pointed toward the bottom 19. Both hook elements 4, 6 are provided with undercuts 8, 9. The undercut 8 is formed by an interlocking element 3 which projects laterally from the projection 7 in the direction of the core 17. The undercuts 8, 9 each have one interlocking edge 10, 11 which extends essentially in the horizontal direction. As can be taken from the figures, the interlocking edges 10, 11 can run at an angle to the horizontal H. Their interlocking action is however pointed in the vertical direction V so that the interlocking edges nevertheless run essentially in the horizontal direction.

The hook element 4 is made elastic and is segmented so that individual spring elements 4 form which are spaced regularly to one another. The elasticity of the spring elements 4 is dictated on the other hand by the thin lower lip 12 which projects from the side edge I to the outside and on its outer end being adjoined by the projection 5, and on the other hand by slots 13 which are made at an angle α in the vertical direction V continuously through the hook element 4 at regular intervals. Each spring element 4 is therefore connected to the core 17 of the panel 1 only on one side. In the region of the projection 5 the lower lip 12 runs at an angle β relative to the horizontal.

Figure 7:
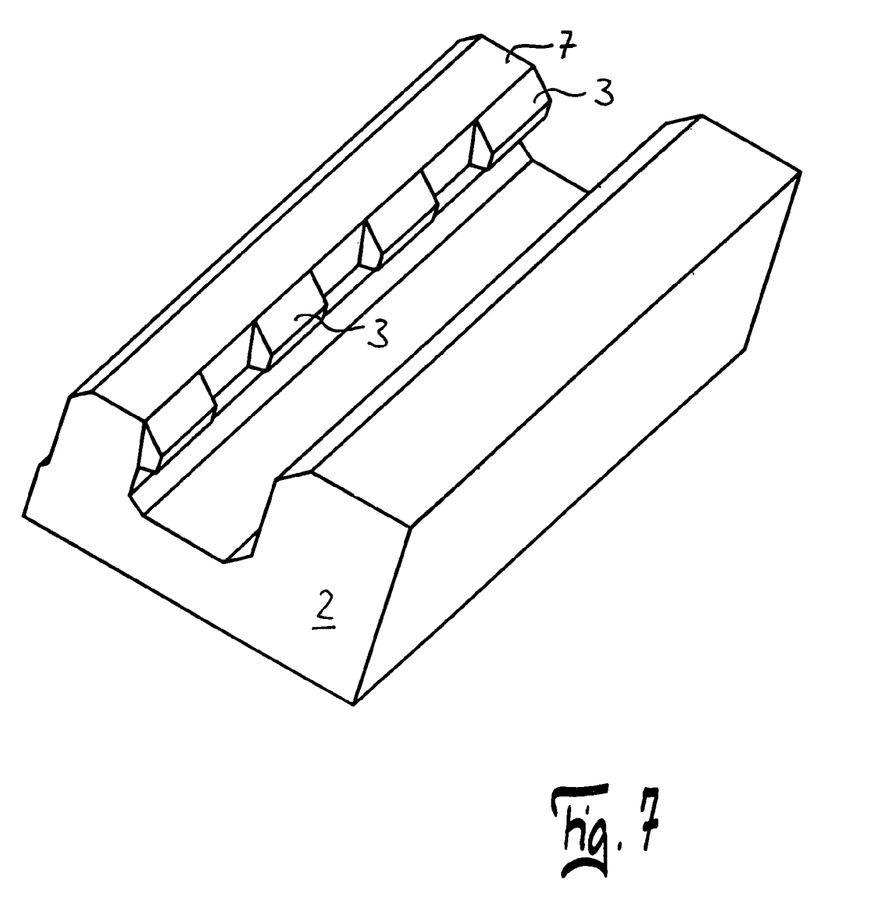
FIG. 7 shows a partial perspective of another embodiment of a panel.
Figure 8:
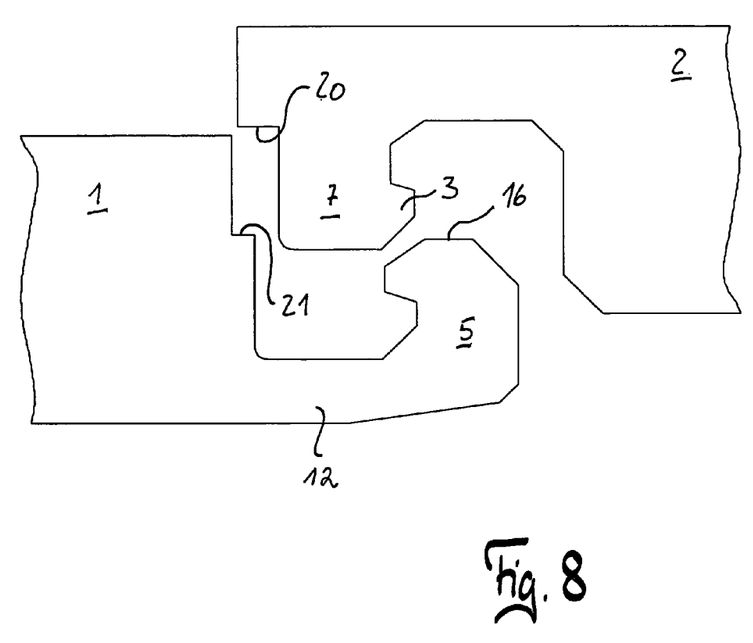
FIG. 8 shows a perspective of two panels during the connection process in another embodiment.

As FIG. 7 shows, the interlocking element 3 can be segmented so that a plurality of interlocking elements 3 spaced parallel is established. In order to be able to set the vertical offset of two panels which are connected to one another independently of the interlocking function, in the exemplary embodiment of the panels 1, 2 shown in FIG. 8 there is one horizontal contact surface 20, 21 each.

Figure 1:
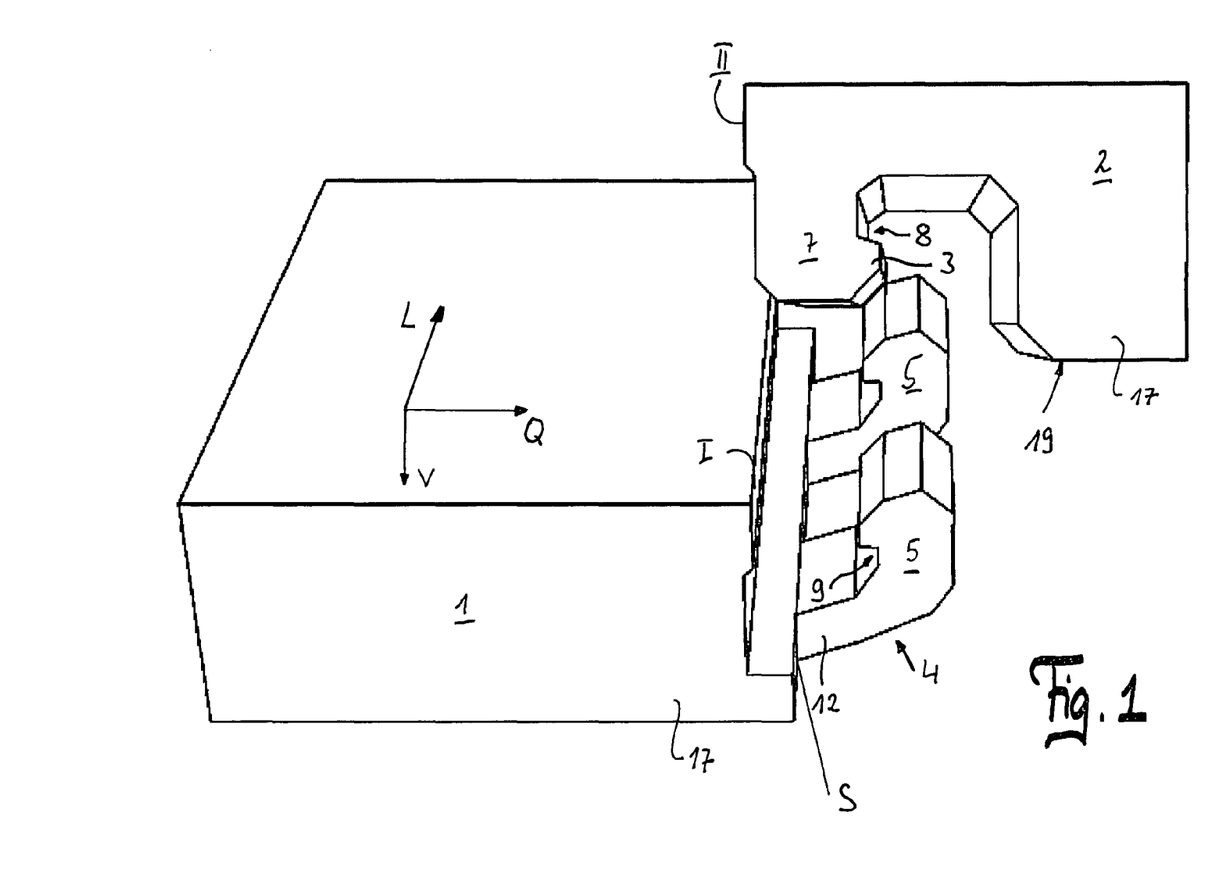
FIG. 1 shows a perspective of two panels during the connection process.
Figure 2A:
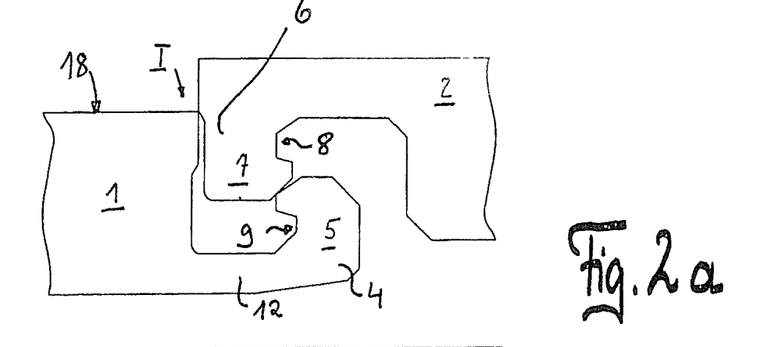
FIGS. 2a to 2d show individual steps of the interlocking.
Figure 2B:
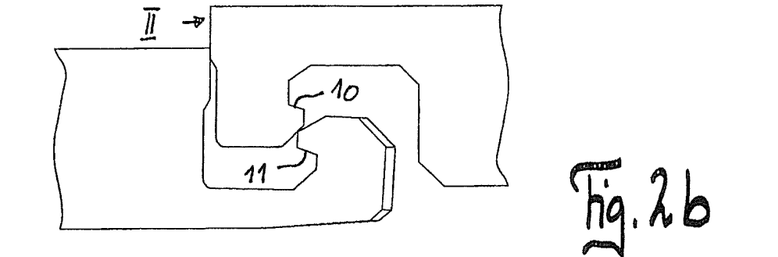
Figure 2C:
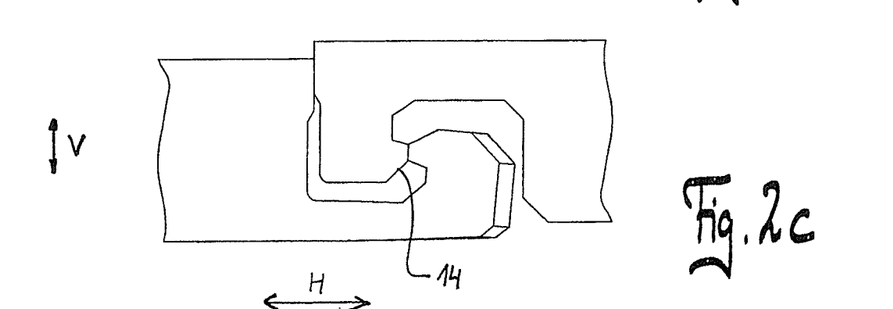
Figure 2D:
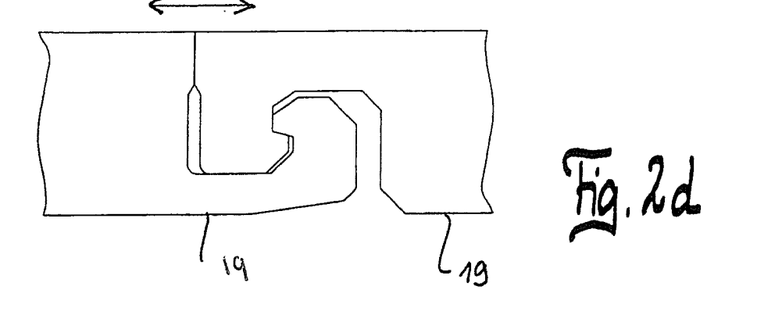
Figure 3:
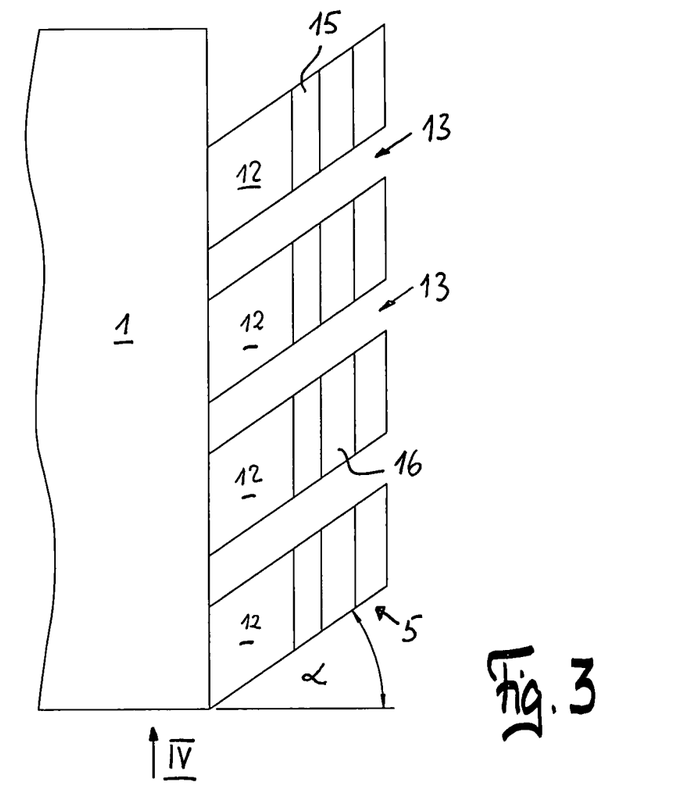
FIG. 3 shows a partial plan view of one panel.
Figure 4:
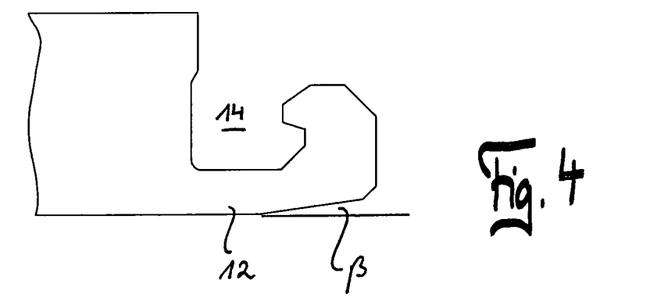
FIG. 4 shows a side view according to the visible arrow IV as shown in FIG. 3.
Figure 5:
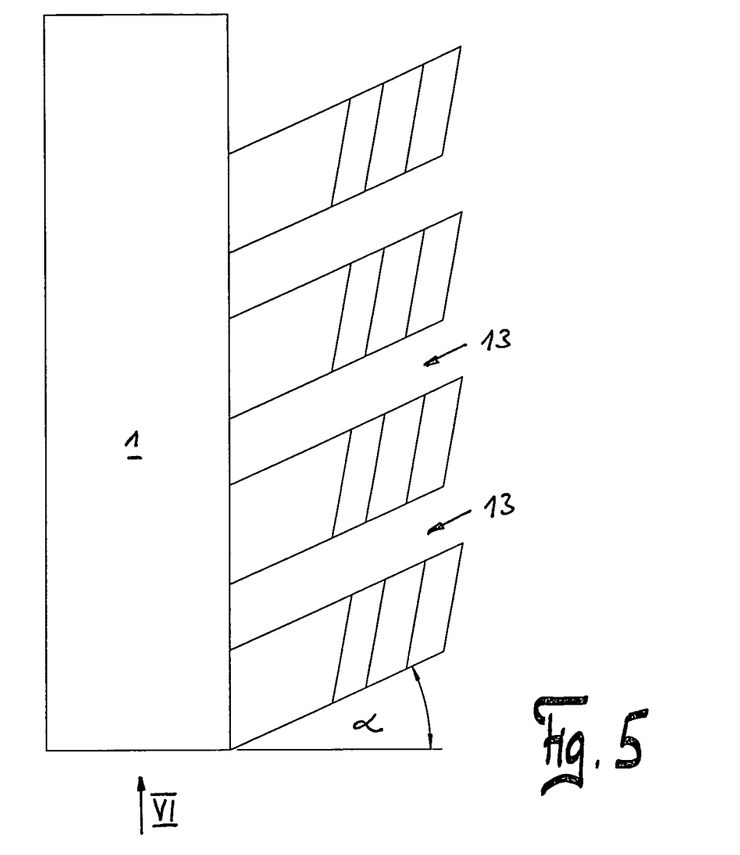
FIG. 5 shows the plan view of the panel in the interlocking position as shown in FIG. 2c.
Figure 6:
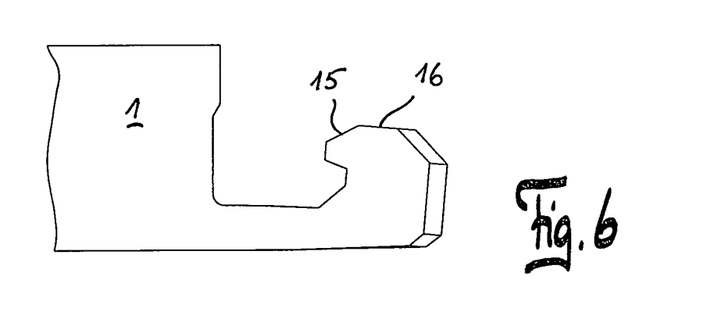
FIG. 6 shows a view of the panel according to visible arrow VI as shown in FIG. 5.

FIGS. 1 and 2a to 2d illustrate the interlocking process. On the longitudinal side which is not shown here the panels 1, 2 are provided with profiling with which it is possible to insert a panel 2 which is to be newly installed at an angle into the longitudinal side of a panel which is already lying on the floor and then to bend it for connecting/interlocking of the longitudinal side onto the subfloor. This profile is disclosed for example in DE 102 24 540 A1, to whose contents reference is made in full. On the transverse side—the short side of a panel 1, 2—there is the profiling as claimed in the invention. The panel 2 which is to be newly installed is linked to the longitudinal side of a panel which is already lying on the floor and with one side edge 2 is placed tightly against a panel 1 which is likewise already connected on its longitudinal side to an already installed panel. Upon pivoting down, the projection 7 with its bevelled bottom 14 comes into contact with the bevelled top 15 of the projection 5 (FIG. 2a), by which the projection 5 first deviates in the transverse direction Q so that the groove 12 which forms between the side edge I and the projection 5 is widened. Because each individual spring element 4 is exposed by the slot which runs obliquely at an angle α relative to the core 17 in the longitudinal direction L of the panel 1, the hook element 5 upon a further lowering motion of the panel 2 can also deviate in the longitudinal direction L of the panel 1. At the same time a pivoting motion of the projection 5 takes place around a pivoting axis S which runs parallel to the longitudinal direction L of the panel 1. To enable this pivoting motion, the lower lip 12 at least in the region of the projection 5 is bevelled at an angle β. The pivoting motion is continued until the lower lip 12 in this region rests on the subfloor, by which a further pivoting motion is prevented (compare FIG. 2c). As the panel 2 continues to be lowered the undercuts 8, 9 overlap one another. The projection 5 springs elastically back around the pivoting axis S and the hook elements 4, 6 hook into one another, the interlocking surfaces 10, 11 lying on one another. The panels 1, 2 which are interlocked with one another tightly adjoin one another in the upper region of the side edges I, II. As FIG. 2d shows, the surfaces 15, 16 of the projection 5 do not have any contact with the panel 2.

DETAILED DESCRIPTION OF THE PRESENT INVENTION

The aforementioned described profile connection has the advantage that it is machined in one piece out of the core material, does not require any outside parts and thus fewer production tolerances need be maintained than otherwise. As a result of the higher stiffness, several forces can be transferred in the vertical direction. The profiling is also suitable for thin panels and tools which can move only on one side, preferably plunge cutters, are necessary for production. Production takes place essentially as described in DE 10 2007 015 048 A1. For producing the undercuts 8, 9 the hook elements 4, 5 are machined by means of a vertical tool which is not shown. The slots 13 which run obliquely to the longitudinal axis L of the panel are produced by cutting tools which plunge into the core 17 in the vertical direction V while the panel 1 is moving past the machining station (not shown). Since the plunging cutting tools are oblique to the transport direction, they must be ground such that they cut both in the direction of plunging and also in the transport direction of the panel 1. This yields a so-called draw-cut.

The invention claimed is:
1. A panel comprising:
a core,
a top and a bottom,
first and second hook elements which correspond to one another on at least two opposite side edges (I, II), wherein:
the first hook element is formed essentially open to the top,
the second hook element is formed essentially open to the bottom,
the first hook element comprises a projection which is pointed essentially toward the top,
the second hook element comprises a projection which is pointed essentially toward the bottom,
two identically made panels can be connected and interlocked to one another in a horizontal (H) and vertical (V) direction with respect to one another by an essentially vertical joining motion,
at least one of the projections deviates in the joining motion in the horizontal direction (H) and then for purposes of vertical interlocking snapping in behind an interlocking edge which extends essentially in the horizontal direction (H), and
at least another one of the hook elements is segmented, and further comprising:
a plurality of spring elements spaced parallel to one another, the spring elements being arranged running obliquely at an angle (α) to a longitudinal axis (L) of the panel.

2. The panel as claimed in claim 1, wherein the projections of the first and second hook elements have an undercut where each undercut has an interlocking edge which extends essentially in the horizontal direction (H).

3. The panel as claimed in claim 1, wherein the first hook element which forms tongue elements is open toward the top.

4. The panel as claimed in claim 1, wherein a bottom of the spring element is bevelled at least in the region of one of the projections at an angle (β) relative to the horizontal (H).

5. The panel as claimed in claim 4, wherein the angle (β)=10°.

6. The panel as claimed in claim 1, wherein the spring elements are spaced regularly to one another.

7. The panel as claimed in claim 1, wherein the core is a wood product.

8. The panel as claimed in claim 1, wherein the core is a wood product and plastic mixture.

9. The panel as claimed in claim 1, further comprising a first contact surface facing towards the bottom and a second contact surface facing toward the top, the first contact surface extending from the first hook element, remote from the core of the panel, and the second contact surface extending from the core, adjacent the second hook element.

10. The panel as claimed in claim 1, wherein the plurality of spring elements have elasticity.

11. The panel as claimed in claim 10, wherein the elasticity of the spring elements is provided by a lower lip which projects from the side edge I to an outside and on its outer end being adjoined by a projection.

12. The panel as claimed in claim 11, wherein the elasticity of the spring elements is further provided by slots which are made at an angle α in the vertical direction V, continuously through the first hook element at regular intervals.

13. The panel as claimed in claim 12, wherein each spring element of the spring elements is connected to the core only on one side.

14. The panel as claimed in claim 13, wherein in a region of the projection, the lower lip runs at an angle β relative to the horizontal (H).

15. The panel as claimed in claim 1, wherein the panel is a floor panel.

16. The panel as claimed in claim 1, further comprising a bevel on a bottom of the spring element which is structured and arranged to provide deviation space for the spring element during the essentially vertical joining motion.

17. The panel as claimed in claim 16, wherein the bevel on the bottom of the spring element is structured and arranged to permit vertical movement of the spring element during the essentially vertical joining motion.

18. The panel as claimed in claim 17, wherein the bevel runs along the bottom of the spring element encompasses a region of its corresponding projection.

19. The panel as claimed in claim 1, wherein the longitudinal axis (L) of the panel is relative to a horizontal plane of the panel.

20. The panel as claimed in claim 19, wherein the angle (α) is relative to a side edge of the panel, adjacent to a side in which extend the plurality of spring elements, and the side edge is along a lengthwise axis thereby permitting the second hook element of a bottom panel to deviate down and at a same time laterally.

21. A method for connecting and interlocking of two panels as claimed in claim 1, wherein:

the panel to be joined with the second hook element which is open to the bottom is pivoted around a nearby pivoting axis which is parallel to a longitudinal side and in doing so the second hook element which is open toward the bottom is continuously and in succession pivoted into the first hook elements of a panel which lies on the floor, wherein the first hook elements are open toward the top, and in doing so the projection of the second hook element grasps the projections of the spring elements in succession next to one another and bends them out elastically, and each projection of each spring element springs back when the undercut formed in it overlaps the one in the projection of the second hook element, the deviating motion of the projections being divided into the following three movements, and further comprising:

displacement of the projection of the first hook element in the transverse direction (Q) of the panel, deviation of the projection of the first hook element in the longitudinal direction (L) of the panel, and widening of a groove which is open to the top and which is made between the projection of the first hook element and the side edge.

22. The method as claimed in claim 21, wherein the widening of the groove is superimposed by a pivoting motion of the projection around a pivoting axis (S) which points in the longitudinal direction (L).

\* \* \* \* \*